UNITED STATES PATENT OFFICE.

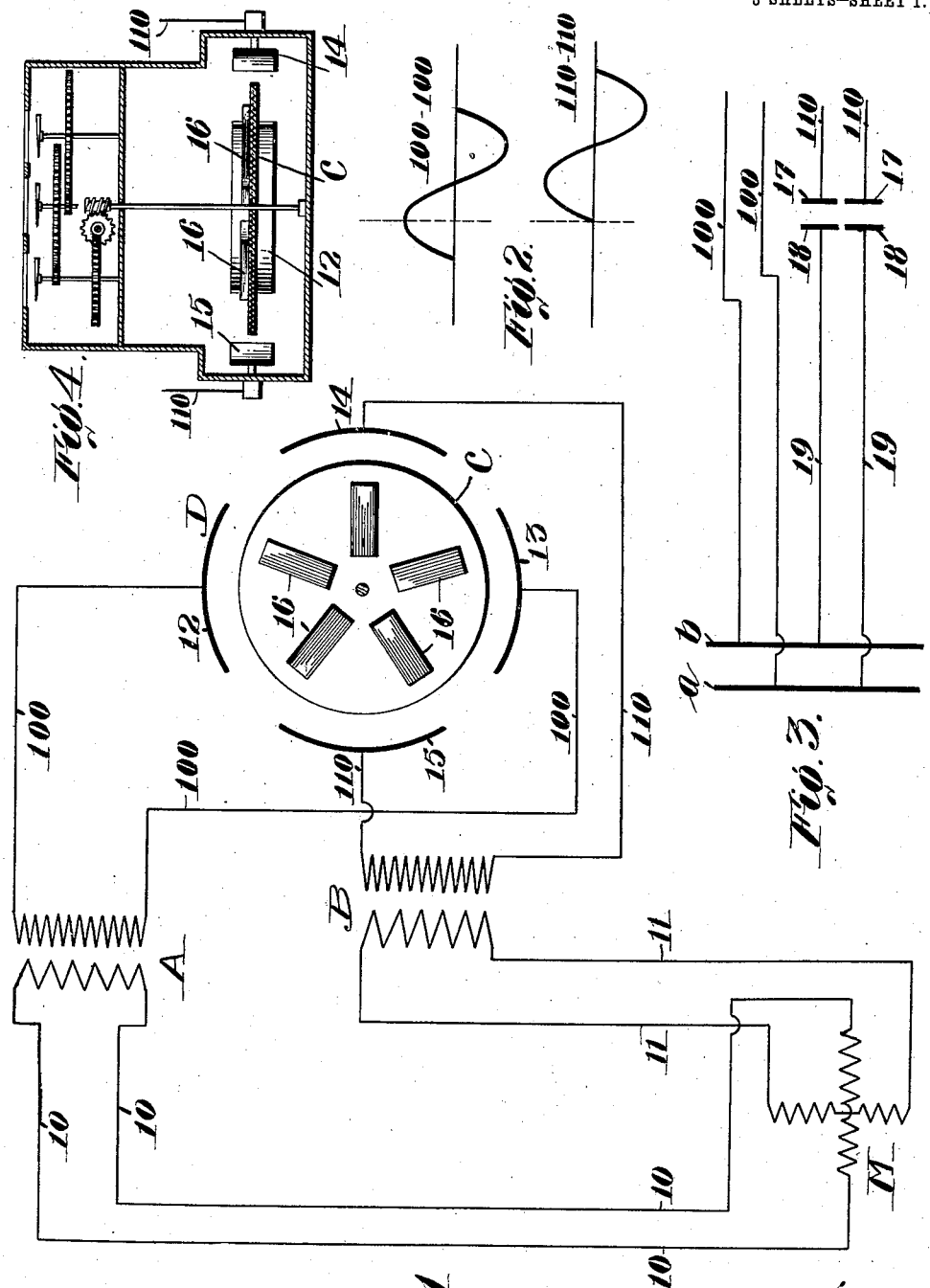

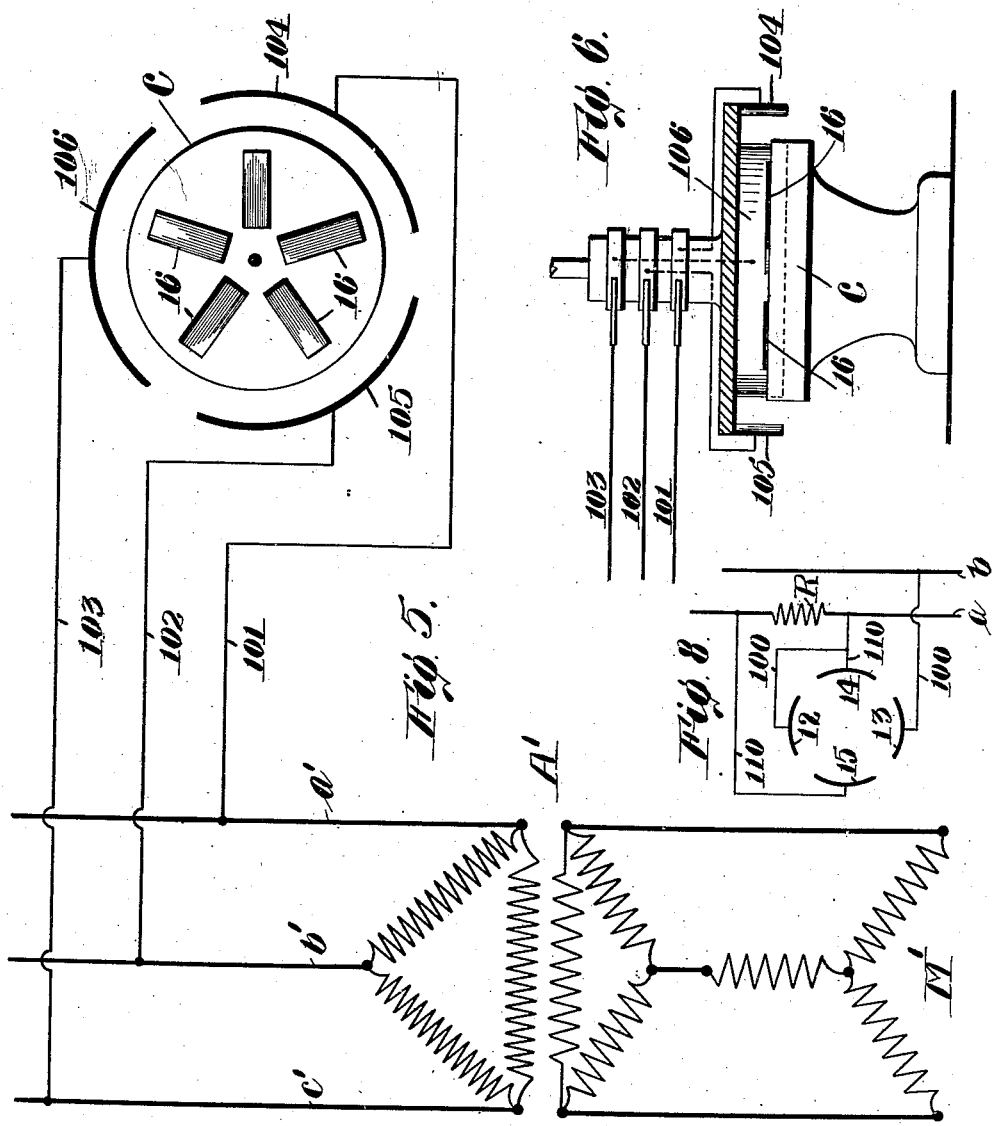

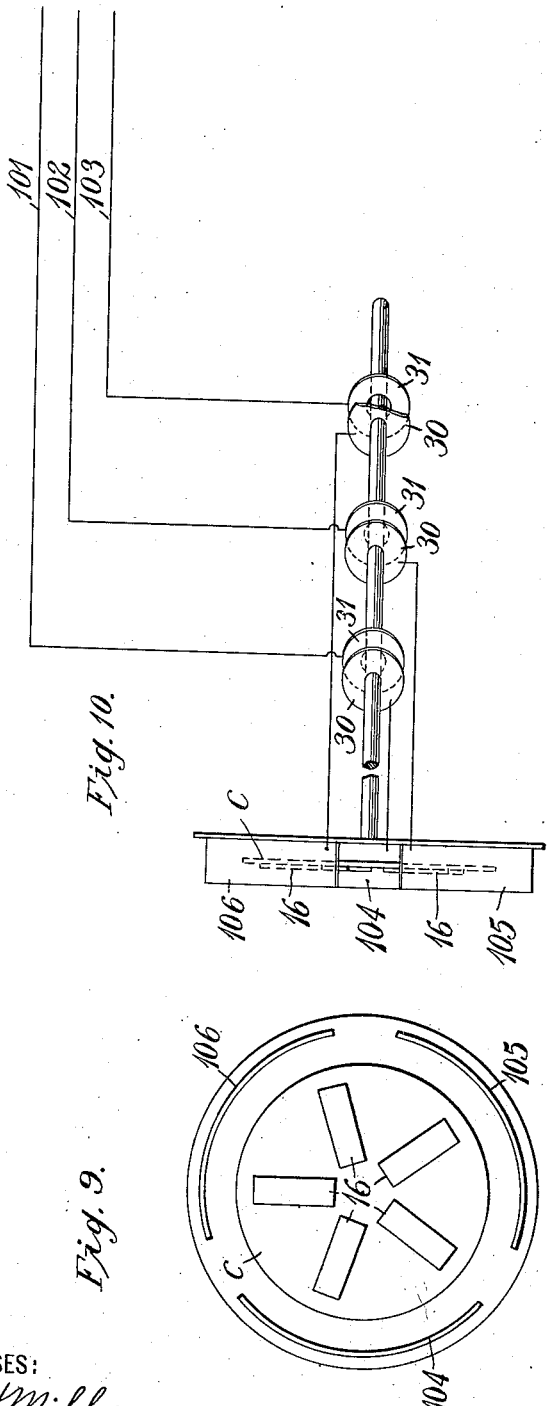

HAROLD B. SMITH, OF WORCESTER, MASSACHUSETTS, ASSIGNOR TO WESTINGHOUSE ELECTRIC AND MANUFACTURING COMPANY, A CORPORATION OF PENNSYLVANIA.

APPARATUS FOR TRANSFORMING ELECTRICAL ENERGY INTO MECHANICAL ENERGY.

993,561.  Specification of Letters Patent.  Patented May 30, 1911.

Application filed May 14, 1908. Serial No. 432,861.

*To all whom it may concern:*

Be it known that I, HAROLD B. SMITH, a citizen of the United States, residing at Worcester, in the county of Worcester and State of Massachusetts, have invented a new and useful Apparatus for Transforming Electrical Energy into Mechanical Energy, of which the following is a specification.

The object of this invention is to provide a translating device by which alternating current energy may be changed into mechanical energy for performing useful work by utilizing the electric tensions to create a moving (preferably a rotating) electric field in one element of the device which is adapted to cause a second element of the device, influenced only by the field produced in the first element, to start from rest and to move or rotate.

My translating device is comparable to an induction motor, the rotating magnetic field being replaced by a rotating electric, or electro-static field, and the primary and secondary magnetizable core members and windings of the induction motor being replaced by members which are respectively adapted to produce, and to be suitably influenced by, the rotating static field.

My invention may be embodied in various structures and I do not wish to be limited to any specific structure or arrangement.

Figure 1 of the accompanying drawings is a diagrammatic view of a system arranged in accordance with and embodying my invention. Fig. 2 is a diagram used for the purpose of explanation; Fig. 3 is a diagrammatic view showing the way the invention may be utilized in connection with a single phase high potential line circuit, or with one circuit of a polyphase system; Fig. 4 is a view showing the motor adapted for metering purposes; Fig. 5 is a diagram showing the way the invention may be utilized in connection with a three-phase high potential line circuit; Fig. 6 is a view partly in section illustrating a modified arrangement of my invention in which the primary member is the moving element; and Fig. 7 is a view showing a modification of the part herein- after termed the secondary member. Fig. 8 is a diagram showing another method of connection hereinafter referred to. Figs. 9 and 10 are diagrammatic views of a motor embodying my invention and having a rotatable primary member to which electric energy is inductively transmitted.

Referring first to the diagram illustrated in Fig. 1, M designates a generator which may be of any standard phase or type, and which in the first reduction to practice was provided with two windings at 90 electrical degrees to each other, the ends of these windings being connected by line wires 10—10 to the primary of a transformer A and by line wires 11—11 to the primary of a second transformer B. By this arrangement, there is produced in each secondary circuit a simple single-phase alternating current of high tension, the two currents from the two transformers being at 90 electrical degrees to each other, as indicated in Fig. 2. The transformers A and B are high tension transformers designed to transform the currents up to high voltage, say 25,000 volts more or less. D designates the motor which is designed to utilize the principle of the rotating electric field. This motor in the simple elementary form illustrated consists of a primary member and a secondary member. The primary member consists of four plates 12, 13, 14 and 15 preferably of conducting material separated from each other and arranged circularly. The two opposite plates 12 and 13 are connected with the secondary circuit 100—100 coming from the transformer A and the other two opposite plates 14 and 15 are connected with the circuit 110—110 coming from the secondary of the other transformer B. The secondary member comprises a circular disk or drum C on which, a number of metallic bars 16 or other parts, which form paths for the electric flux are arranged. These parts are preferably of such a number as not to offer a symmetrical arrangement with the plates of the primary member, in the drawing five of such parts being shown relatively to the four plates of the primary member. The disk or drum C is preferably constructed of glass or may be formed of some other material in which phenomena are produced which serve to render the device self-starting in the same way that an induction motor is self-starting. The secondary member constructed as thus described, is arranged within the plates 12, 13, 14 and 15 of the primary member. In the construction now under discussion, the primary member is held stationary and the secondary member is arranged so as to revolve within the plates of the primary member.

The operation is as follows:—Suppose the generator is in position where the circuit 100—100 has the greatest voltage or electric tension developed; that is, the parts are in position where the effect through the transformers is to develop at the plate 12 the maximum positive electric tension, and at the plate 13 the maximum negative electric tension. Then there will be created in the motor an electric field or flux passing diametrically across the same from the plate 12 to plate 13. In this position the plates 14 and 15 have diametrically between them the minimum electric field or flux. Now as the generator rotates 90 electrical degrees the electric tension or flux between plates 12 and 13 will diminish and the electric positive tension will commence on plate 14 and the electric negative tension will commence on plate 15. This will cause a progressive shifting of the electric field from between plates 12 and 13 to between plates 14 and 15 and until plates 14 and 15 receive the maximum pressure from their circuit 110—110 causing the maximum electric flux between them and until the tension falls to a minimum in the circuit 100—100 and the flux between plates 12 and 13 becomes a minimum. Thus the electric field will be carried to between plates 14 and 15. The next rotation of the generator of 90 electrical degrees will cause the electric field to shift progressively from plates 14 and 15 to plates 13 and 12; the next rotation of 90 electrical degrees will cause the electric field to shift progressively to plates 15 and 14; and the next rotation of 90 electrical degrees will cause the electric field to shift progressively back to its initial position; that is, to between plates 12 and 13. Thus the electric field will rotate progressively around the plates. As the electric field is generated between the plates, an electric current will traverse the secondary member parts 16 on the rotating member C, and as the electric field rotates, as before described, the electric tension along the lines of force of the electric field, or the electric flux, will cause the secondary member to follow the rotation of the electric field. In this way, the energy of an alternating current or currents will be transformed into mechanical energy.

Although, as just described, the secondary member tends to follow the rotation of the electric field, the motor will not start unless, as pointed out in a previous paragraph, the secondary member comprises a part, such as the glass disk C, in which a certain amount of energy is consumed, since, without this member, the device is analogous to a synchronous motor and is unable to develop a starting torque, although the rotating field is present.

The number of plates employed in the primary is not limited to four for a two-phase, or three for a three-phase circuit, but may be any desired multiple of each respectively.

The above explains the method of operation. The device is capable of ready application to transmission lines carrying currents of high potential. For example, in Fig. 3, let $a$—$b$ be a circuit carrying a single phase alternating current of high voltage, and suppose that it is desired to take power from the same. In this instance one circuit 100—100 can be taken directly from the line wires $a$ and $b$, and the other circuit 110—110 may be connected to plates 17—17 exposed to plates 18—18 connected by wires 19—19 to the line wires $a$ and $b$. By this or other convenient arrangement the plates 17—17 will receive electric tension from the plates 18—18, and there will be enough time displacement between the electric inductive effects to put the tensions in the circuits 100—100 and 110—110 out of time or phase with each other so that a rotating electric field will be generated in the motor.

The motor described may be utilized for power purposes or may be utilized for metering purposes. In Fig. 4 the motor is shown as having the secondary member connected to a suitable gearing for operating the indexes of a meter. The motor is also applicable to a three-phase circuit, and such application thereof is shown in diagram in Fig. 5. In this diagram M' designates a star-wound three-phase generator. This generator is connected to the primary terminals of transformers A', or to any other convenient three-phase transformer connection from which lead the line wires $a'$, $b'$ and $c'$. The transformers A' are high tension transformers. The line wires $a'$, $b'$ and $c'$ represent a three-wire high tension three-phase working circuit. Power may be taken from this circuit by wires 101, 102 and 103 connected respectively to said line wires $a'$, $b'$ and $c'$. These wires are connected to three plates 104, 105 and 106 which form the plates of a primary member of a motor, such as previously described, and which has a secondary member C having a number of parts 16 thereon for receiving the electric flux, and which member will rotate by reason of the rotating electric field generated between the plates of the primary member. This illustrates the application of the motor to the ordinary three-phase high potential system.

The primary member may be made the rotating member of the motor if desired by using the usual contact rings as illustrated in Fig. 6, and by holding the secondary member stationary.

As shown in Figs. 9 and 10 of the drawings, the contact rings may be avoided by the use of parts such as the opposed plates or disks 30 and 31 which are arranged to provide suitable electric inductive effects without mechanical contact, one set being stationary, and the other rotary. I also have obtained good rotative effects by using different things for the parts of the secondary member. For example, as illustrated in Fig. 7, I have used a number of vacuum tubes I on the member C, and these tubes form an effective path for the electric flux. Rotation can be produced by use of the same.

When the motor is used for metering purposes and connected as previously described, its operation depends upon the voltage of the working circuit. If it is desired to measure the power of the circuit, the connections shown in Fig. 8 may be used. In this figure an impedance or series transformer R is interposed in one line $a$ of the single-phase high potential line circuit $a$—$b$ and the connections 110—110 for the plates 14 and 15 are made at opposite sides of said impedance or to the series transformer. With this arrangement, by properly proportioning the parts, the torque will be varied with the load on the wires $a$ and $b$ beyond the meter, and hence the rotation of the motor may be used to meter the power. The wires $a$ and $b$ may be also considered as two of the wires of a polyphase circuit. Various other modifications of connections to accomplish the purpose desired by means of the rotating electric field will suggest themselves. It is not necessary for the electric field to be of uniform intensity throughout its rotation in order to secure mechanical rotation.

The principle of the moving or rotating electric field is applicable no matter what kind of alternating current is used, and whether the electric tensions are produced by polyphase or displaced or split single-phase electro-motive forces. In other words, the underlying principle is the production of a moving electric field, preferably of a rotating type and the production of mechanical movement therefrom, preferably rotating movement. The device is also capable of other power uses and increased torque can be secured by suitable modification of the principles and the capacity system.

The utilization of the rotating electric field I believe will become important, owing to the increasing importance of the application of high voltages common in long-distance power transmission. By proportioning the parts so as to secure suitable potential gradients for the dielectrics employed in the construction, it is possible to secure economical electric fluxes for operation.

Many applications of the broad principle of the invention will suggest themselves to a skilled electrician in analogy to the uses now made of the rotating magnetic fields. I do not wish, therefore, to be limited in any way to details of construction or specific application but

What I claim and desire to secure by Letters-Patent of the United States is:—

1. An electrostatic motor comprising a primary member embodying means, energized from an external source, for producing a rotating electrostatic field, and a secondary member independent of any external source and influenced by said rotating field to produce a relative rotation of the members.

2. An electrostatic motor comprising a primary member embodying means energized from an external source for producing a shifting electrostatic field, and a secondary member independent of any external source and influenced by said shifting electrostatic field to produce a relative movement of said members.

3. An electrostatic motor comprising a primary member embodying means, energized from an external source, for producing a rotating electrostatic field, and a secondary member having a plurality of parts independent of any external source and so influenced solely by said rotating field that continuous rotation of said secondary member is initiated and maintained.

4. An electric motor comprising a primary member having a plurality of circularly arranged plates upon which electrical tensions may be impressed to produce a rotating electric field, and a secondary member independent of any external source and influenced by said rotating field to produce a relative rotation of the members.

5. An electric motor comprising a primary member capable of producing a rotating electric field, and a secondary member having a plurality of parts electrically independent of each other and of any source of electric current and exposed to the influence of said rotating field to initiate and maintain a continuous rotation of said secondary member.

6. An electric motor comprising a primary member having a plurality of conducting parts adapted to produce a rotating electrostatic field when energized by out-of-phase electromotive forces, and a secondary member comprising a plurality of parts that are independent of any external source of current and are so influenced by the rotating electrostatic field that a relative rotation of the two members is produced.

In testimony whereof I have hereunto set my hand, in the presence of two subscribing witnesses.

HAROLD B. SMITH.

Witnesses:
J. ELMER HALL,
LOUIS W. SOUTHGATE.